(12) United States Patent
Teragawa

(10) Patent No.: US 10,634,950 B2
(45) Date of Patent: Apr. 28, 2020

(54) ILLUMINATION APPARATUS CAPABLE OF INHIBITING TEMPERATURE RISE IN THE CASING AND DISPLAY APPARATUS INCLUDING THE ILLUMINATION APPARATUS

(71) Applicant: SAKAI DISPLAY PRODUCTS CORPORATION, Sakai-shi, Osaka (JP)

(72) Inventor: Daisuke Teragawa, Sakai (JP)

(73) Assignee: SAKAI DISPLAY PRODUCTS CORPORATION, Sakai-shi, Osaka (JP)

( * ) Notice: Subject to any disclaimer, the term of this patent is extended or adjusted under 35 U.S.C. 154(b) by 0 days.

(21) Appl. No.: 16/343,270

(22) PCT Filed: Oct. 24, 2016

(86) PCT No.: PCT/JP2016/081471
§ 371 (c)(1),
(2) Date: Jun. 26, 2019

(87) PCT Pub. No.: WO2018/078699
PCT Pub. Date: May 3, 2018

(65) Prior Publication Data
US 2019/0310515 A1  Oct. 10, 2019

(51) Int. Cl.
*G02F 1/1335* (2006.01)
*G02F 1/1333* (2006.01)
(Continued)

(52) U.S. Cl.
CPC ......... *G02F 1/133603* (2013.01); *F21S 2/00* (2013.01); *G02F 1/133385* (2013.01); *G02F 1/133608* (2013.01)

(58) Field of Classification Search
CPC ......... G02F 1/133603; G02F 1/133608; G02F 1/133385; G02F 2201/36; G02F 2001/133628; F21S 2/00
See application file for complete search history.

(56) References Cited

U.S. PATENT DOCUMENTS 7,894,014 B2   2/2011  Kawase et al.
2009/0135330 A1  5/2009  Kawase et al.
(Continued)

FOREIGN PATENT DOCUMENTS

JP   2007-206577 A   8/2007
JP   2009-129707 A   6/2009
(Continued)

*Primary Examiner* — Tracie Y Green
(74) *Attorney, Agent, or Firm* — ScienBiziP, P.C.

(57) ABSTRACT

A back light (200) is provided with: a back chassis (7) that has a bottom plate (40) in which a plurality of through-holes (41) are formed; a substrate (3) that has a surface on which a plurality of LEDs (2) are mounted and that is held by the bottom plate (40) outside a casing (13) so that the optical axes of the LEDs (2) overlap the respective through-holes (41); and a light transmissive plate-like member (6) that is superimposed on the bottom plate (40) from the inside of the casing (13) so as to close the through-holes (41). Thus, provided is an illumination apparatus (200) in which temperature increase inside the casing (13) is suppressed.

8 Claims, 8 Drawing Sheets

(51) Int. Cl.
  *G02F 1/13357*  (2006.01)
  *F21S 2/00*   (2016.01)

(56) References Cited

U.S. PATENT DOCUMENTS

| | | | |
|---|---|---|---|
| 2013/0222754 A1* | 8/2013 | Kohtoku | G02F 1/133603 349/161 |
| 2016/0057850 A1* | 2/2016 | Kang | G02F 1/133308 361/749 |
| 2019/0227368 A1* | 7/2019 | Sim | G02F 1/13306 |

FOREIGN PATENT DOCUMENTS

| | | |
|---|---|---|
| JP | 2013-528030 A | 7/2013 |
| WO | 2011/046133 A1 | 4/2011 |
| WO | 2013/021987 A1 | 2/2013 |

* cited by examiner

ILLUMINATION APPARATUS CAPABLE OF INHIBITING TEMPERATURE RISE IN THE CASING AND DISPLAY APPARATUS INCLUDING THE ILLUMINATION APPARATUS

TECHNICAL FIELD

The present invention relates to an illumination apparatus and a display apparatus.

BACKGROUND ART

A backlight that is an example of an illumination apparatus is used to illuminate a liquid crystal panel in a liquid crystal display apparatus that is an example of a display apparatus. The backlight includes light sources mounted on a substrate and a casing which shuts in light emitted from the light sources. When lighting up the backlight, heat is generated from the light sources of the backlight. Since the liquid crystal molecules filling the inside of the liquid crystal panel degenerate at high temperature, a display fault may occur in a case where the generated heat is not sufficiently dissipated out of the casing. In particular, liquid crystal display apparatuses have been increasing in luminance in recent years. As luminance increases, problems related to heat dissipation become apparent because the number of light sources used in the liquid crystal display apparatus or the amount of electric current input to the light sources increases.

In Patent Literature 1 for example, a liquid crystal display apparatus is disclosed which includes a substrate on which light sources that are heat sources is mounted. The substrate is attached to a bottom chassis which is made of metallic material and is a part of a casing.

CITATION LIST

Patent Literature

[Patent Literature 1]
Patent Literature 1: Japanese Patent Application Laid-Open Publication No. 2009-129707

SUMMARY OF INVENTION

Technical Problem

When the generated luminance of all light sources increases due to the number of light sources increasing or electric current input to the light sources increasing, the heat quantity generated from all of the heat sources also increases simultaneously. In this case, a heat radiating part of the liquid crystal display apparatus disclosed in Patent Literature 1 may not sufficiently dissipate heat from the substrate to the outside of the casing. Therefore, the temperature of the liquid crystal panel or the like may rise, causing a display fault to occur.

An object of the present invention is to provide an illumination apparatus capable of inhibiting the temperature inside the casing from rising and a display apparatus including the illumination apparatus.

Solution to Problem

An illumination apparatus according to one embodiment of the present invention includes: a casing with a bottom plate having a plurality of through holes; a substrate with a surface to which a plurality of light sources are mounted; and an optically transmissive plate-shaped member superimposed on the bottom plate from inside the casing so as to close the through holes. The substrate is held by the bottom plate outside the casing such that optical axes of the light sources respectively coincide with the through holes.

A display apparatus according to the embodiment of the present invention includes the illumination apparatus and a display panel which displays an image by controlling transmittance of emitted light from the light sources.

Advantageous Effects of Invention

In the illumination apparatus and the display apparatus including the illumination apparatus according to the embodiment of the present invention, the temperature inside the casing can be inhibited from rising by arranging the substrate with the light sources mounted thereon outside the casing, and dust can be prevented from entering into the casing through the through holes in the bottom plate of the casing by providing the plate-shaped member so as to close the through holes.

DESCRIPTION OF EMBODIMENTS

The following describes embodiments of the present invention with reference to the accompanying drawings.

First Embodiment

Figure 1:
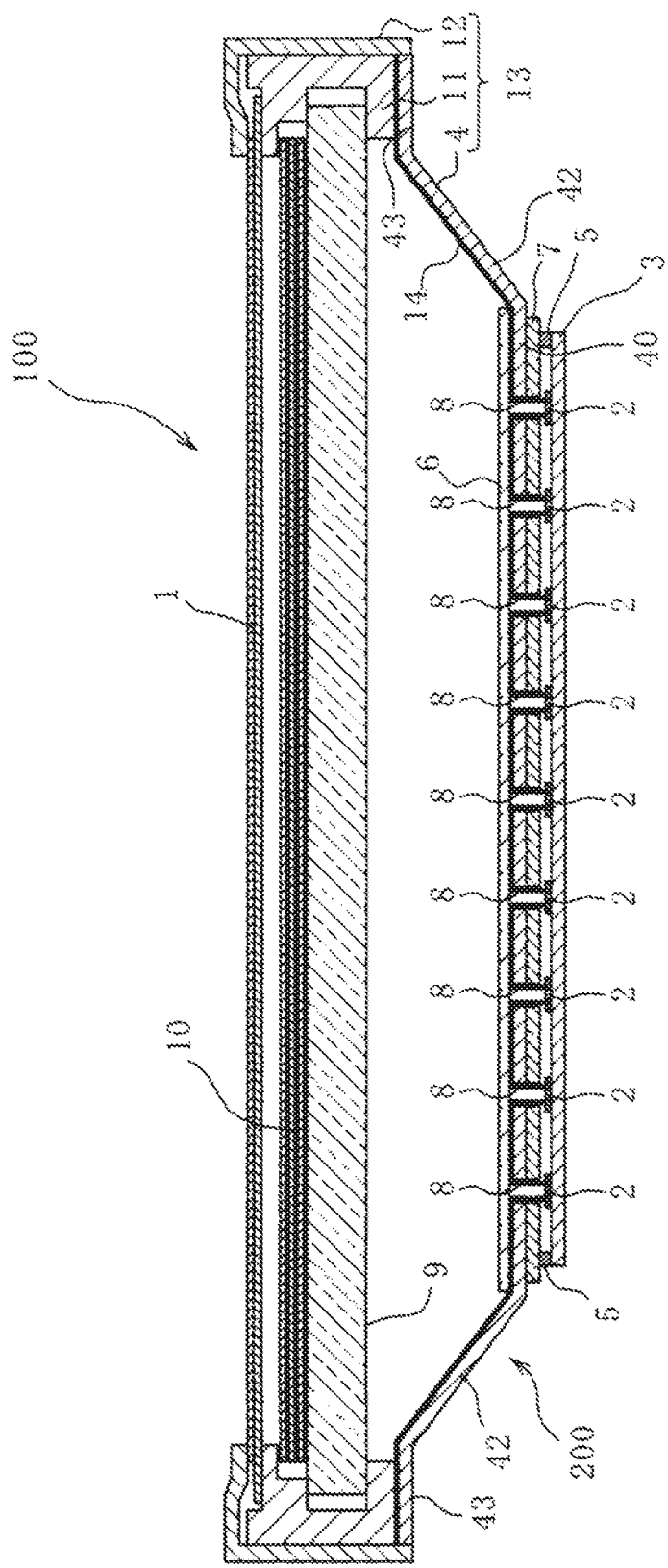
FIG. 1 is a cross-sectional view of a display apparatus according to a first embodiment.

FIG. 1 is a cross-sectional view of a liquid crystal display apparatus (display apparatus) 100 according to a first embodiment. The liquid crystal display apparatus 100 includes a liquid crystal panel (display panel) 1 which displays an image (including a video) and a backlight (illumination apparatus) 200 which radiates light to the liquid crystal panel 1.

The backlight 200 includes a plurality of light emitting diodes (LEDs) 2 which is an example of light sources, a substrate 3 to which the LEDs 2 are mounted, and a back chassis 4.

The LEDs 2 are arranged lengthwise and crosswise on a surface of the substrate 3. The LEDs 2 are mounted to the surface of the substrate 3 in such a number that a desired luminance can be achieved. In particular, the pitch between the LEDs 2 is sufficiently small to implement a high-luminance liquid crystal display apparatus 100 according to the present embodiment. When the pitch between the LEDs 2 is sufficiently small, the high-luminance liquid crystal display apparatus 100 can be implemented and occurrence of non-uniform luminance in the liquid crystal panel 1 can be inhibited.

From the viewpoint of heat dissipation, the substrate 3 is preferably made of metal with high thermal conductivity such as aluminum. Herein, in the present specification, heat dissipation includes dissipation of heat carried by the liquid crystal display apparatus 100 to the outside of the liquid crystal display apparatus 100, and the temperature of the liquid crystal panel 1 is inhibited from rising as a result of the heat dissipation. Wiring for sending electric current to the LEDs 2 is formed on the surface of the substrate 3 using a patterned copper foil 30 (refer to FIG. 2). The wiring formed using the patterned copper foil 30 is electrically connected to an unillustrated drive circuit. The LEDs 2 generate light by converting electric power supplied from the drive circuit to light.

The back chassis 4 has a bottom plate 40 with a rectangular level surface, side plates 42 located on ends of the bottom plate 40 and standing diagonally therefrom, and a frame-shaped edge 43 located on ends of the side plates 42 and spreading parallel to the above-mentioned level surface of the bottom plate 40. In the bottom plate 40, a plurality of through holes 41 (refer to FIG. 2) is formed so as to respectively coincide with the positions of the optical axes of the LEDs 2 on the substrate 3. The shape of the cross-section of a through hole 41 is for example circular in a plane perpendicular to a direction penetrating the bottom plate 40, and is preferably similar to the cross-section of a later-described cylindrical member 8.

In the present specification, the term "outside" of an object of interest means in a direction away from the object, and the term "inside" means in an opposite direction (a direction towards the center of gravity of the object, for example) to the direction away from the object. Unless mentioned otherwise, surfaces toward the outside or the inside are respectively referred to as outer surfaces and inner surfaces in the members which constitute the display apparatus 100. For example, a surface of the bottom plate 40 which faces the outside of the back chassis 4 is referred to as an outer surface of the bottom plate 40 and a surface (opposite surface) of the bottom plate 40 which faces the inside of the back chassis 4 is referred to as an inner surface of the bottom plate 40. Similarly in the side plates 42, a surface of a side plate 42 which faces the outside of the back chassis 4 in a side plate 42 is referred to as an outer surface of the side plate 42 and an opposite surface of the side plate 42 which faces the inside of the back chassis 4 is referred to as an inner surface of the side plate 42. According to the present embodiment, the substrate 3 is arranged on the outside of the bottom plate 40 of the back chassis 4. A spacer 5 is provided between the substrate 3 and the bottom plate 40 of the back chassis 4, and the substrate 3 and the bottom plate 40 of the back chassis 4 are screwed together through the spacer 5. Therefore, the substrate 3 and the back chassis 4 are arranged separately from each other.

A reflecting sheet 14 which reflects light is attached to a substantial entirety of the inner surface of the back chassis 4, except for in positions at which the through holes 41 (refer to FIG. 2) are formed. A plate-shaped member 6 is superimposed on the bottom plate 40 from inside the back chassis 4 so as to close the through holes 41 (refer to FIG. 2). In detail, the plate-shaped member 6 is placed on the inner surface of the back chassis 4 through the reflecting sheet 14. The plate-shaped member 6 is for example a single-sheeted rectangular plate with substantially the same size as the bottom plate 40 of the back chassis 4. Alternatively, a plurality of plate-shaped members 6 may be arranged side by side on the bottom plate 40 of the back chassis 4. The plate-shaped member 6 is made of a resin material such as a transparent acrylic, and is optically transmissive. The plate-shaped member 6 may be fixed to the back chassis 4 by screwing.

A sheet-shaped heat insulator 7 is attached to the outer surface of the bottom plate 40 of the back chassis 4 except for in positions at which the through holes 41 (refer to FIG. 2) are formed. That is, to inhibit the flow of heat from the substrate 3 to the back chassis 4, the heat insulator 7 is arranged between the substrate 3 and the back chassis 4 with openings provided therein at positions matching those of the through holes 41.

Figure 2:
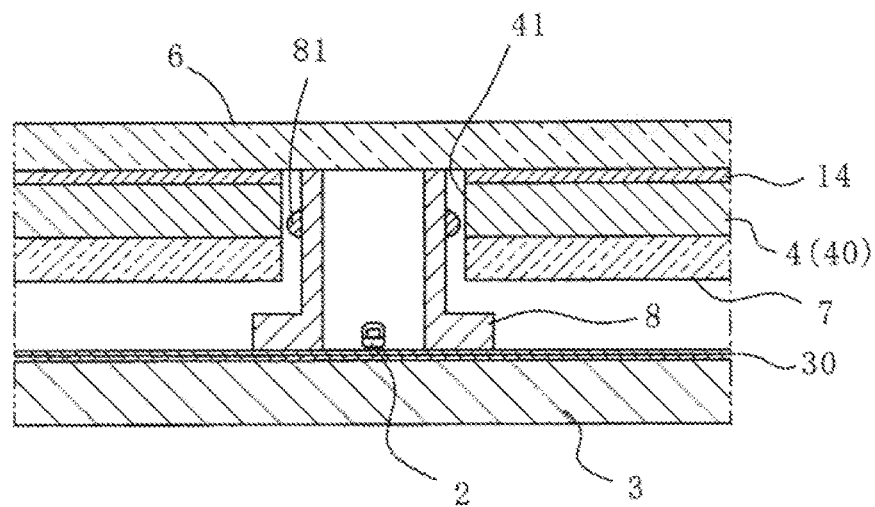
FIG. 2 is a cross-sectional view of a main part configuration of the display apparatus according to the first embodiment.

FIG. 2 is a cross-sectional view of a configuration of a through hole 41 in the back chassis 4. A cylindrical member 8 is inserted into each of the through holes 41. The cylindrical member 8 is made of a white resin material which reflects light. According to the present embodiment, an end of the cylindrical member 8 adjacent to the plate-shaped member 6 is in contact with the plate-shaped member 6, and an end of the cylindrical member 8 away from the plate-shaped member 6 is in contact with the substrate 3 so as to surround an LED 2 on the substrate 3. Through the above, the cylindrical member 8 reflects light emitted from the LED 2 on an inner surface of the cylindrical member 8 and guides the light into the back chassis 4. However, the above-mentioned adjacent end of the cylindrical member 8 need not be in contact with the plate-shaped member 6. The cylindrical member 8 need only be configured to be capable of guiding the light emitted from the LED 2 into the back chassis 4.

A ring-shaped rib (first scaling member) 81 is provided on the outer surface of the cylindrical member 8 to block a space between the cylindrical member 8 and the back chassis 4. The ring-shaped rib 81 surrounds the cylindrical member 8 along the outer surface of the cylindrical member 8 and is in contact with the back chassis 4 inside the through hole 41. In addition, the ring-shaped rib 81 is preferably made of a material such as elastic resin and is more preferably pushed into the back chassis 4 from the viewpoint of dust protection. The condition of the cylindrical member 8 is not particularly limited, and may be made of a resin or a metal or formed by rounding a reflecting sheet. The ring-shaped rib 81 may be a separate member from the cylindrical member 8 or may be integral with the cylindrical member 8.

As illustrated in FIG. 1, a rectangular frame-shaped panel chassis 11 with an outer shape substantially the same as that of the back chassis 4 is in contact with the edge 43 of the back chassis 4 such that the outer edges of the panel chassis 11 and the back chassis 4 are aligned with each other.

A diffuser plate 9 with rectangular first and second surfaces and a side surface surrounding the first and second surfaces is arranged parallel to the bottom plate 40. The diffuser plate 9 is held by the panel chassis 11 through fitting the entirety of the side surface of the diffuser plate 9 into a groove formed in an inner circumferential surface of the panel chassis 11. The diffuser plate 9 is made of a transparent resin material such as an acrylic and includes a light scattering material. Herein, "includes light scattering material" means produced using a material in which particles capable of scattering light are dispersed.

The diffuser plate 9 internally diffuses light radiated to a back surface (surface adjacent to the back chassis 4) of the diffuser plate 9 and emits the light from a front surface (surface adjacent to the liquid crystal panel 1) of the diffuser plate 9.

In the present specification, the term "front" from the viewpoint of direction means a direction toward the user from the display apparatus 100, or an image display direction of the display apparatus 100. The term "back" from the viewpoint of direction means a direction opposite to the front direction. Unless mentioned otherwise, surfaces facing forward and backward are respectively referred to as first and second surfaces in the members which constitute the display apparatus 100. That is, the diffuser plate 9 internally diffuses light radiated to the second surface of the diffuser plate 9 and emits the light from the first surface of the diffuser plate 9.

An optical sheet laminate 10 is provided to face the first surface of the diffuser plate 9. In the optical sheet laminate 10, for example, one transparent diffusion sheet and two transparent prism sheets are layered together. The diffusion sheet diffuses light inputted to output light of uniform luminance. The prism sheets align the entered light in a single direction.

The liquid crystal panel 1 is arranged opposite to the first surface of the panel chassis 11 so as to cover the entirety of an opening of the panel chassis 11. The edges of the liquid crystal panel 1 are in contact with the first surface of the panel chassis 11. In the liquid crystal panel 1, a surface away from the back chassis 4 (that is, a first surface of the liquid crystal panel 1) is the display surface which displays an image.

A frame-shaped bezel 12 with an L-shaped cross-section is provided so as to cover the outer circumferential surface of the panel chassis 11 and the edges of the liquid crystal panel 1. That is, the liquid crystal panel 1 is held between the panel chassis 11 and the bezel 12. A casing 13 is constituted by the back chassis 4, the panel chassis 11, and the bezel 12.

In the liquid crystal display apparatus 100 with the above configuration, the light emitted from each of the LEDs 2 passes through each corresponding cylindrical member 8 and the plate-shaped member 6 and advances into the casing 13. At this time, light leakage out of the casing 13 does not occur because each cylindrical member 8 reliably guides the light emitted from a corresponding LED 2 into the casing 13.

The light advanced into the casing 13 directly penetrates the second surface of the diffuser plate 9, or is reflected by the reflecting sheet 14 to indirectly penetrate the second surface of the diffuser plate 9. The light advanced into the diffuser plate 9 is diffused and uniformed inside the diffuser plate 9 and emitted from the first surface.

The light uniformed by the diffuser plate 9 penetrates the optical sheet laminate 10. As described earlier, by advancing into the optical sheet laminate 10, the light is further uniformed and the advancing direction of the light is aligned along a normal vector direction vertical to the optical sheet laminate 10.

The light emitted from the optical sheet laminate 10 penetrates the second surface of the liquid crystal panel 1. The liquid crystal panel 1 displays an image according to a signal input from an unillustrated control circuit on the display surface of the liquid crystal panel 1 by controlling the transmittance of light per pixel according to the input signal.

As described earlier, it is necessary to supply electric power to the LEDs to generate light for displaying an image on the liquid crystal display apparatus. However, some of the electric power supplied to the LEDs is converted to heat in generating light, causing the temperature inside the casing to rise. In the liquid crystal display apparatus 100 of the present embodiment, the substrate 3 on which the LEDs 2 are mounted is arranged on the outside of the casing 13. The heat from the LEDs 2 is generated outside the casing 13, which does not lead to the temperature rising inside the casing 13. As such, the temperature of the liquid crystal panel 1 can be inhibited from rising, and display fault in the liquid crystal panel 1 can be inhibited. Furthermore, the optical axes of the LEDs 2 are configured so as to respectively coincide with the through holes 41 in the bottom plate 40 of the back chassis 4. As such, the light emitted from the LEDs 2 passes through the through holes 41 in the bottom plate 40 of the back chassis 4, enters into the casing 13, and is radiated to the liquid crystal panel 1 even though the substrate 3 is arranged on the outside of the casing 13.

In a case where through holes are formed on the bottom plate of the back chassis, dust protection measures become necessary because dust may enter into the casing through the through holes. In the liquid crystal display apparatus 100 of the present embodiment by contrast, the plate-shaped member 6 which closes the through holes 41 is provided, thereby preventing dust from entering into the casing 13 through the through holes 41.

According to the present embodiment, the cylindrical member 8 reliably guides the light emitted from each of the LEDs 2 into the casing 13 and light leakage out of the casing 13 can be prevented.

Also according to the present embodiment, dust protection is improved because the space between the cylindrical member 8 and the back chassis 4 is blocked by the ring-shaped rib 81.

Second Embodiment

Figure 3:
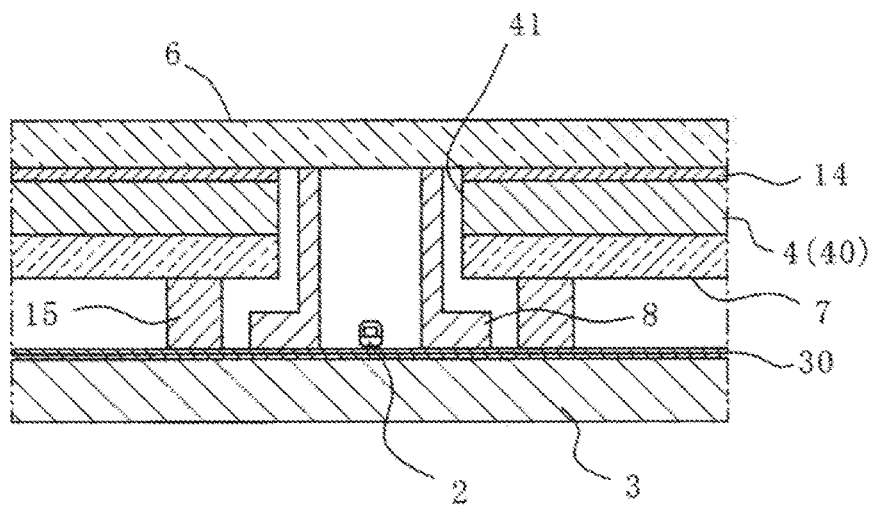
FIG. 3 is a cross-sectional view of a main part configuration of the display apparatus according to a second embodiment.

FIG. 3 is a cross-sectional view of a configuration of a through hole 41 in the back chassis 4 of the liquid crystal display apparatus 100 according to a second embodiment. In the liquid crystal display apparatus 100 of the present embodiment illustrated in FIG. 3, a ring (second sealing member) 15 is used instead of the ring-shaped rib 81 (refer to FIG. 2) of the first embodiment. Aside from configuration related to this, the configuration of the liquid crystal display apparatus 100 is the same as that in the first embodiment of FIGS. 1 and 2. Accordingly, elements that are the same in configuration as those illustrated in FIGS. 1 and 2 are labeled with the same reference signs and description thereof is omitted.

According to the present embodiment, the ring 15 is held between the bottom plate 40 and the substrate 3 and surrounds each of the LEDs 2 along the surface of the substrate 3 to prevent the space between the back chassis 4 and the substrate 3 from communicating with each through hole 41. In other words, the ring 15 is arranged so as to surround the cylindrical member 8 and divide the space occurring between the bottom plate 40 and the substrate 3 into a position adjacent to and a position away from each LED 2. The ring 15 is for example made of an elastic rubber, and is preferably arranged between the back chassis 4 and the substrate 3 in a crushed state. That is, the present embodiment preferably includes an urging member (screw, for example) to reduce the relative distance between the substrate 3 and the back chassis 4.

According to the present embodiment, dust protection can be improved because communication between the through hole 41 and the space between the back chassis 4 and the substrate 3 is prevented by the ring 15.

Third Embodiment

Figure 4:
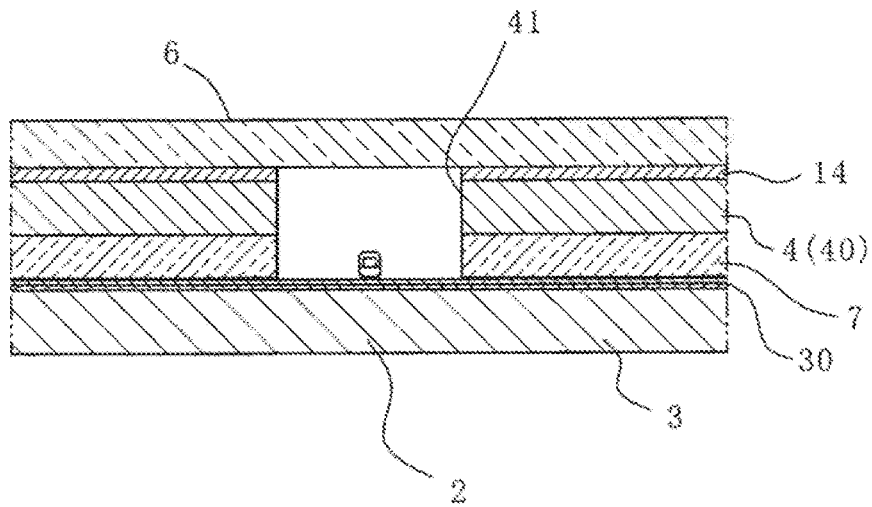
FIG. 4 is a cross-sectional view of a main part configuration of the display apparatus according to a third embodiment.

FIG. 4 is a cross-sectional view of a configuration of a through hole 41 in the back chassis 4 of the liquid crystal display apparatus 100 according to a third embodiment. In the liquid crystal display apparatus 100 of the present embodiment illustrated in FIG. 4, the cylindrical member 8 (refer to FIG. 1) and the spacer (refer to FIG. 1) of the first embodiment are not provided and a space between the back chassis 4 and the substrate 3 does not substantially exist. Aside from configuration related to this, the configuration of the liquid crystal display apparatus 100 is the same as that in the first embodiment of FIGS. 1 and 2. Accordingly, elements that are the same in configuration as those illustrated in FIGS. 1 and 2 are labeled with the same reference signs and description thereof is omitted.

According to the present embodiment, the surface of the substrate 3 is indirectly in contact with the outer surface of the bottom plate 40 of the back chassis 4 through the heat insulator 7 attached across the entirety of the surface of the substrate 3. As such, space does not substantially exist between the back chassis 4 and the substrate 3. The LEDs 2 are also arranged inside respectively corresponding through holes 41.

According to the present embodiment, the through holes 41 are closed off from the outside of the bottom plate 40 because the outer surface of the bottom plate 40 of the back chassis 4 and the substrate 3 are in contact with each other across the entirety of these surfaces. As such, dust protection can be improved without providing additional configuration such as the ring-shaped rib 81 (refer to FIG. 2) or the ring 15 (refer to FIG. 3). Furthermore, the light emitted from an LED 2 can be guided into the casing 13 without light leakage occurring even though the cylindrical member 8 is not provided because space does not substantially exist between the back chassis 4 and the substrate 3.

That is, the present embodiment preferably further includes an urging member causing the surface of the substrate 3 to be in contact with the outer surface of the bottom plate 40 of the back chassis 4. For example, the present embodiment can be implemented by screwing the substrate 3 to the bottom plate 40 of the back chassis 4 without the spacer 5 or attaching adhesive tape to the surface (except for areas corresponding to the inside of the through holes 41) of the substrate 3.

Fourth Embodiment

Figure 5:
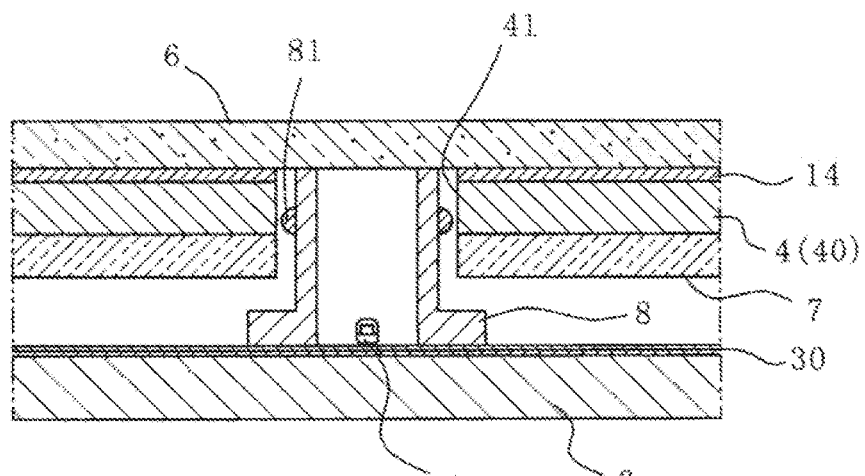
FIG. 5 is a cross-sectional view of a main part configuration of the display apparatus according to a fourth embodiment.

FIG. 5 is a cross-sectional view of a configuration of a through hole 41 in the back chassis 4 of the liquid crystal display apparatus 100 according to a fourth embodiment. In the liquid crystal display apparatus 100 of the present embodiment illustrated in FIG. 5, the plate-shaped member 6 has a light diffusing function. Aside from configuration related to this, the configuration of the liquid crystal display apparatus 100 is the same as that in the first embodiment of FIGS. 1 and 2. Accordingly, elements that are the same in configuration as those illustrated in FIGS. 1 and 2 are labeled with the same reference signs and description thereof is omitted.

According to the present embodiment, the plate-shaped member 6 includes a light scattering material. Herein, that the plate-shaped member 6 includes a light scattering material means that the plate-shaped member 6 is produced by hardening a material in which particles capable of scattering light are dispersed.

According to the present embodiment, light inside the casing is successfully diffused and the luminance of the liquid crystal panel 1 can be further uniformed because the plate-shaped member 6 includes light scattering material.

Fifth Embodiment

Figure 6:
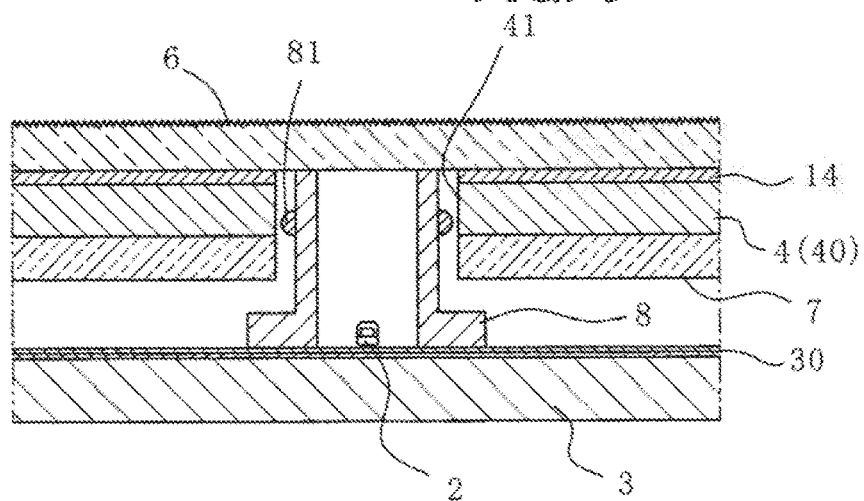
FIG. 6 is a cross-sectional view of a main part configuration of the display apparatus according to a fifth embodiment.

FIG. 6 is a cross-sectional view of a configuration of a through hole 41 in the back chassis 4 of the liquid crystal display apparatus 100 according to a fifth embodiment. In the liquid crystal display apparatus 100 of the present embodiment illustrated in FIG. 6, the plate-shaped member 6 has a light diffusing function. Aside from configuration related to this, the configuration of the liquid crystal display apparatus 100 is the same as that in the first embodiment of FIGS. 1 and 2. Accordingly, elements that are the same in configuration as those illustrated in FIGS. 1 and 2 are labeled with the same reference signs and description thereof is omitted.

According to the present embodiment, the front surface (surface opposite to the surface superimposed on the bottom plate 40) of the plate-shaped member 6 is subjected to embossing processing.

According to the present embodiment, light is successfully diffused inside the casing 13 and the luminance of the liquid crystal panel 1 can be further uniformed because the front surface of the plate-shaped member 6 is subjected to embossing processing.

Sixth Embodiment

Figure 7:
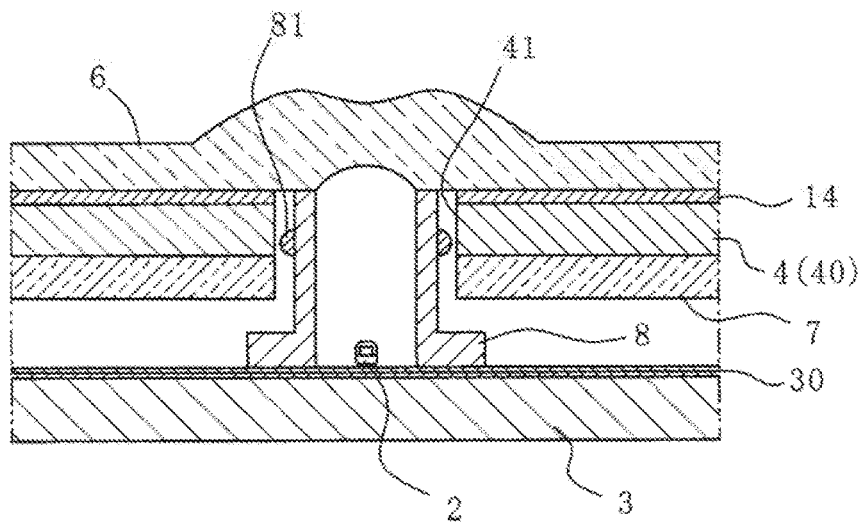
FIG. 7 is a cross-sectional view of a main part configuration of the display apparatus according to a sixth embodiment.

FIG. 7 is a cross-sectional view of a configuration of a through hole 41 in the back chassis 4 of the liquid crystal display apparatus 100 according to a sixth embodiment. In the liquid crystal display apparatus 100 of the present embodiment illustrated in FIG. 7, the plate-shaped member 6 has a light diffusing effect. Aside from configuration related to this, the configuration of the liquid crystal display apparatus 100 is the same as that in the first embodiment of FIGS. 1 and 2. Accordingly, elements that are the same in configuration as those illustrated in FIGS. 1 and 2 are labeled with the same reference signs and description thereof is omitted.

According to the present embodiment, a light diffusing lens structure is formed on the front surface of the plate-shaped member 6 in each of positions coinciding with the optical axes of the LEDs 2. Herein, a light diffusing lens structure means a structure with a light diffusing function.

According to the present embodiment, light is successfully diffused inside the casing 13 and the luminance of the liquid crystal panel 1 can be further uniformed because the light diffusing lens structure is formed on the plate-shaped member 6.

Seventh Embodiment

Figure 8:
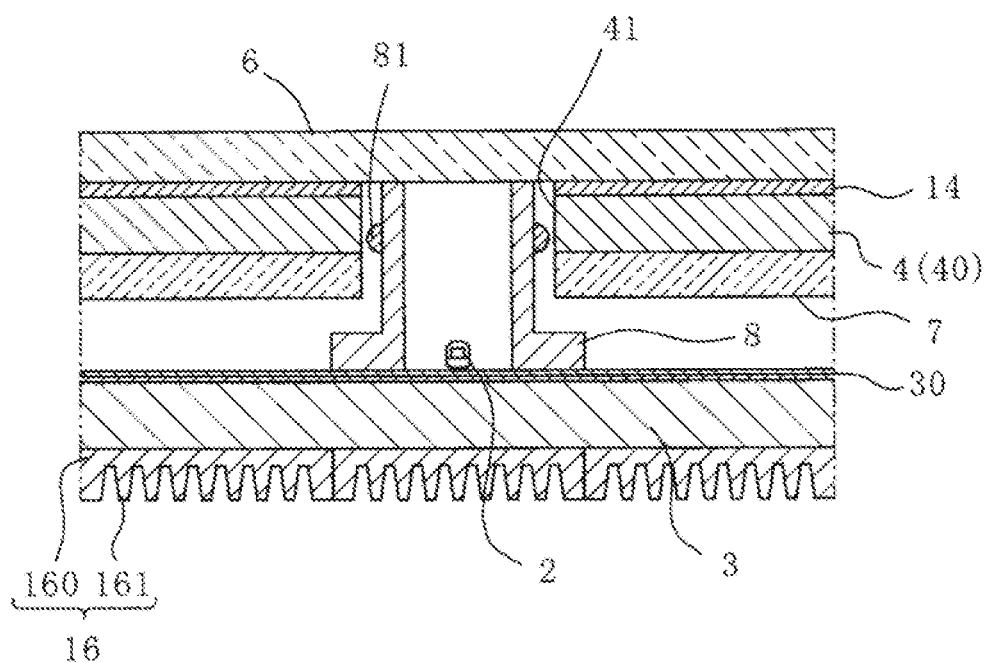
FIG. 8 is a cross-sectional view of a main part configuration of the display apparatus according to a seventh embodiment.

FIG. 8 is a cross-sectional view of a configuration of a through hole 41 in the back chassis 4 of the liquid crystal display apparatus 100 according to a seventh embodiment. The liquid crystal display apparatus 100 of the present embodiment illustrated in FIG. 8 has a heat dissipating mechanism on the reverse surface of the substrate 3. Specifically, a heat spreader (heat dissipating member) 16 is adhered to the substrate 3. Aside from configuration related to this, the configuration of the liquid crystal display apparatus 100 is the same as that in the first embodiment of FIGS. 1 and 2. Accordingly, elements that are the same in configuration as those illustrated in FIGS. 1 and 2 are labeled with the same reference signs and description thereof is omitted.

According to the present embodiment, the heat spreader 16 is attached to a reverse surface of the substrate 3. The reverse surface of the substrate 3 is a surface opposite to the mounting surface which is the surface to which the LEDs 2 are mounted. The heat spreader 16 includes a flatly plate-shaped base 160 in contact with the reverse surface of the substrate 3 and a plurality of thinly rectangular heat dissipating fins 161 parallel to each other and standing perpendicularly from a surface opposite to the attachment surface of the base 160. The heat spreader 16 is made of a metal with high thermal conductivity such as copper or aluminum. The base 160 and the heat dissipating fins 161 are integral with each other. The base 160 of the heat spreader 16 is for example screwed to the substrate 3. Lubricant such as silicone grease with high thermal conductivity is preferably applied to fill in the space between the substrate 3 and the base 160 of the heat spreader 16.

The heat generated from the LEDs 2 is conducted to the heat spreader 16 through the substrate 3. The heat conducted from the substrate 3 is efficiently dissipated in air because the surface area of the surface of the heat spreader 16 is increased by the heat dissipating fins 161 standing from the base 160. That is, the heat generated from the LED 2s is mainly dissipated toward the back of the illumination apparatus 200 from the reverse surface of the substrate 3 through the heat spreader 16 provided on the reverse surface of the substrate 3. Accordingly, heat generated from the LEDs 2 is further inhibited from transferring into the casing 13 because the amount of heat dissipated from the surface of the substrate 3 toward the casing 13 is reduced.

Figure 9:
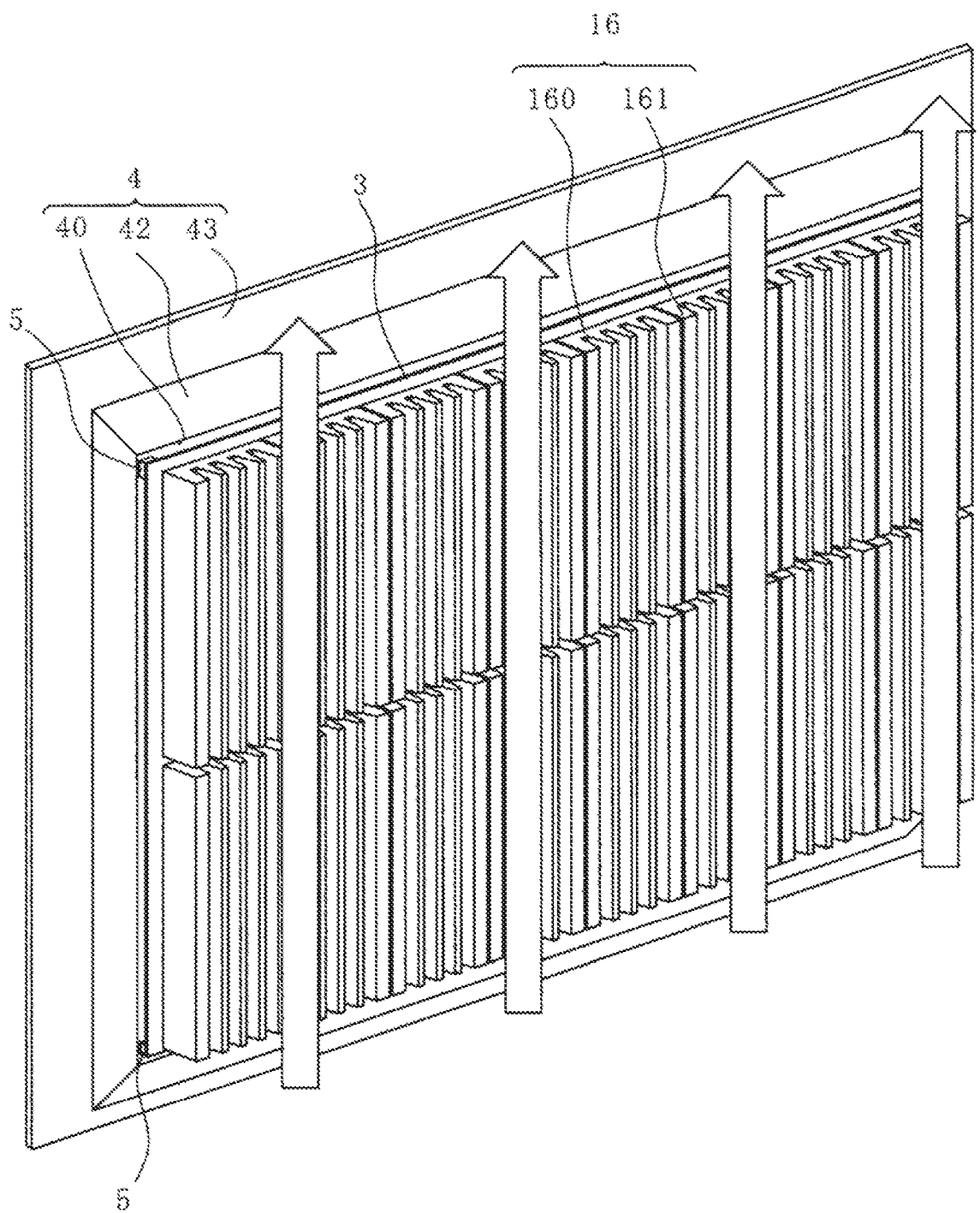
FIG. 9 is a perspective view illustrating a back chassis of the display apparatus according to the seventh embodiment as viewed from behind.
Figure 10:
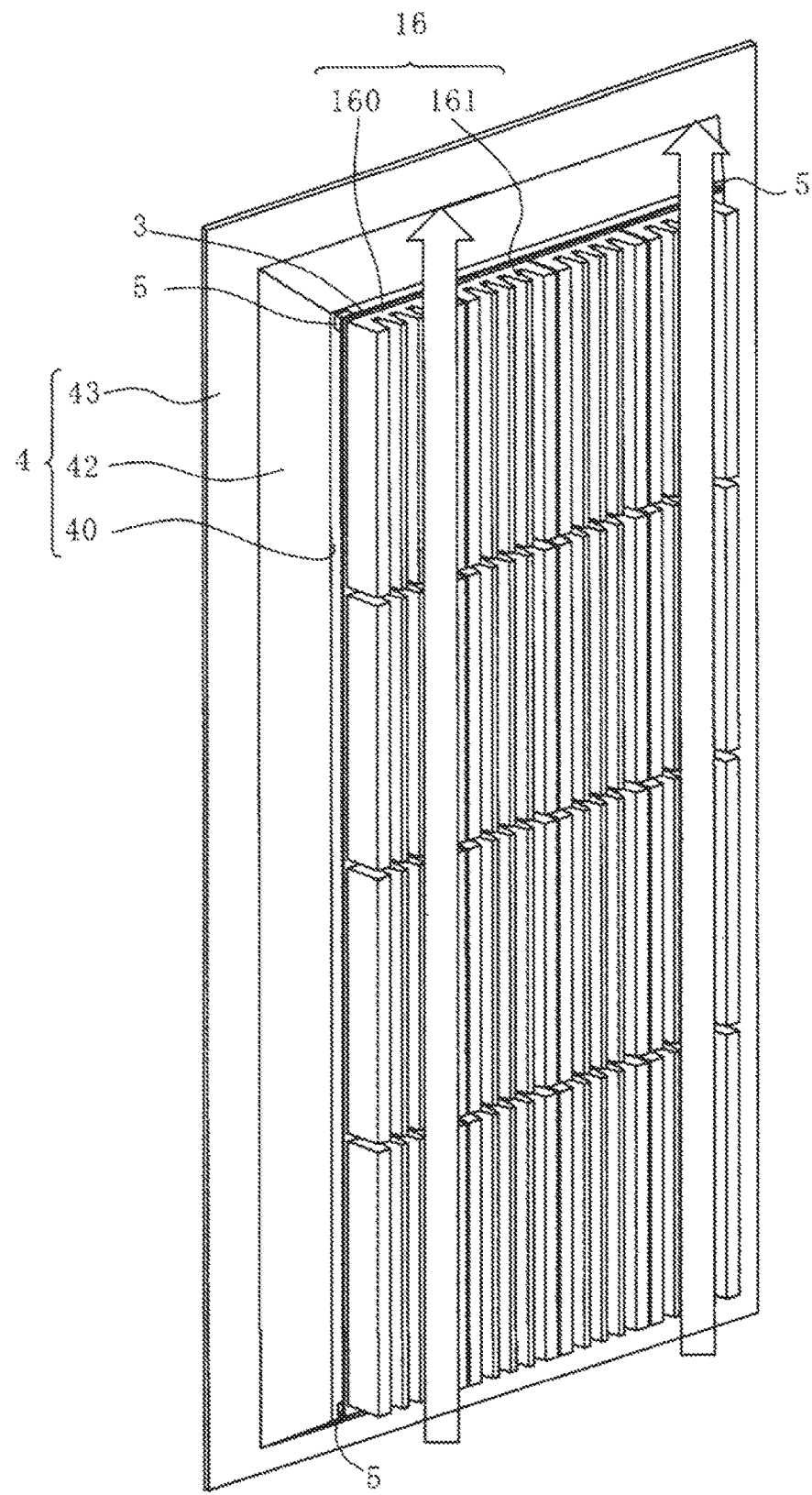
FIG. 10 is a perspective view illustrating the back chassis of the display apparatus according to a variation of the seventh embodiment as viewed from behind.

FIGS. 9 and 10 are perspective views of the back chassis 4 of the display apparatus 100 according to the seventh embodiment as viewed from behind. In the liquid crystal display apparatus 100 of the present embodiment illustrated in FIG. 9, the heat spreader 16 is attached such that the heat dissipating fins 161 extend in the short direction of the display apparatus 100 and the display apparatus 100 is arranged horizontally such that the short direction is an up-and-down direction. In the liquid crystal display apparatus 100 according to a variation of the present embodiment illustrated in FIG. 10, the heat spreader 16 is attached such that the heat dissipating fins 161 extend in the longitudinal direction of the display apparatus 100, and the display apparatus 100 is arranged vertically such that the longitudinal direction is the up-and-down direction.

Since the heat dissipating fins 161 extend in the up-and-down direction in either of the examples illustrated in FIGS. 9 and 10, air warmed and expanded by the heat dissipated from the heat spreader 16 rises in the space between the heat dissipating fins 161 due to buoyancy, and cool air of the surroundings newly flows in between the heat dissipating fins 161. Due to the flow of such air, warm air is exchanged for cool air and the substrate 3 may be more efficiently cooled. Therefore, the display apparatus 100 according to the present embodiment is preferably arranged such that the heat dissipating fins 161 extend in the up-and-down direction as illustrated in FIG. 9 or 10.

Eighth Embodiment

Figure 11:
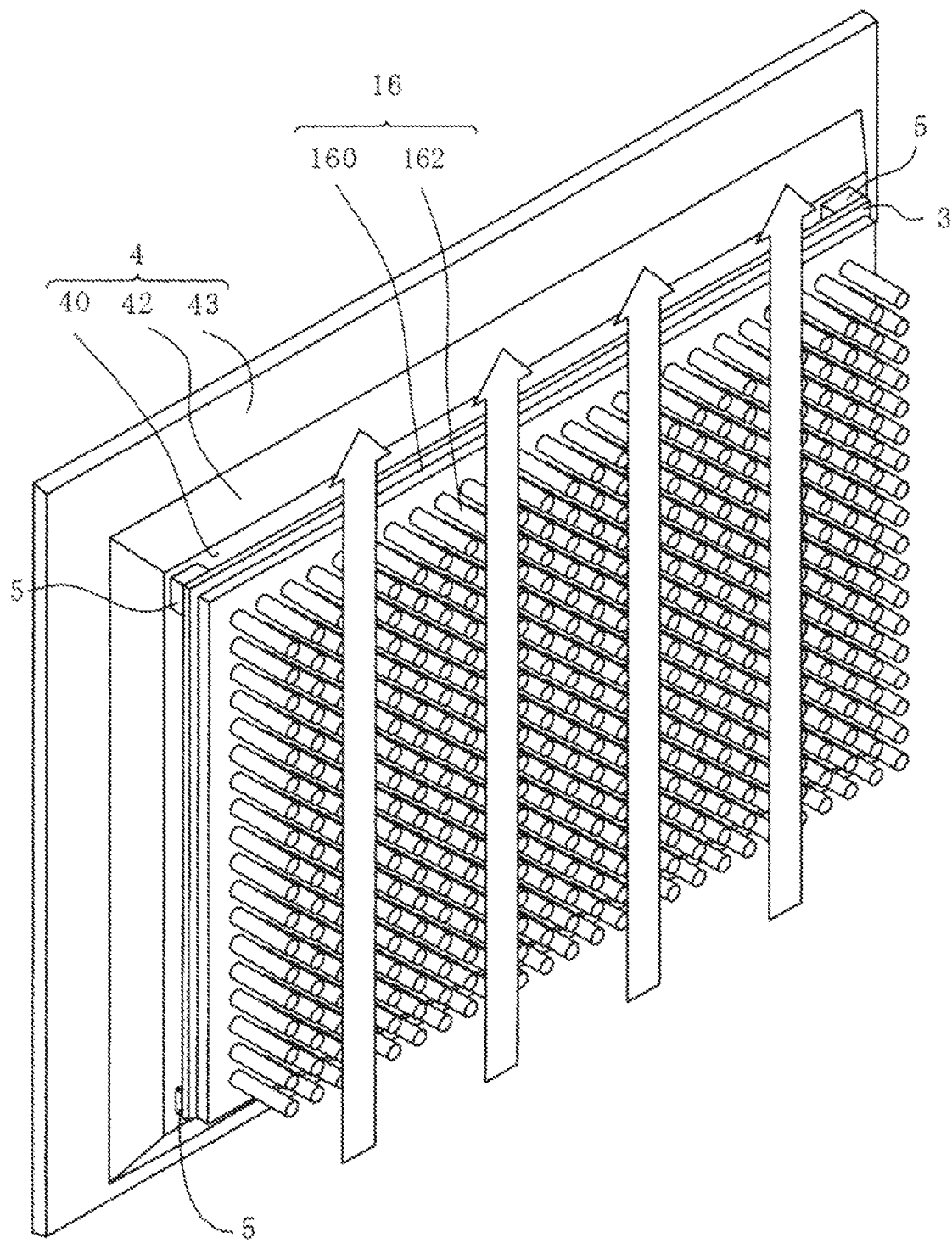
FIG. 11 is a perspective view illustrating the back chassis of the display apparatus according to an eighth embodiment as viewed from behind.

FIG. 11 is a perspective view of the back chassis 4 of the display apparatus 100 according to an eighth embodiment as viewed from behind. The liquid crystal display apparatus 100 of the present embodiment illustrated in FIG. 11 has a heat dissipating mechanism on the reverse surface of the substrate 3. Specifically, heat dissipating pins 162 are used instead of the heat dissipating fins 161 of the seventh embodiment. Aside from configuration related to this, the configuration of the liquid crystal display apparatus 100 is the same as that in the seventh embodiment of FIGS. 8 to 10. Accordingly, elements that are the same in configuration as those illustrated in FIGS. 8 to 10 are labeled with the same reference signs and description thereof is omitted.

According to the present embodiment, the heat spreader 16 includes a plurality of heat dissipating pins 162 extending perpendicular from the surface of the base 160 opposite to the attachment surface of the base 160. Likewise in the seventh embodiment, the heat spreader 16 is made of a metal with high thermal conductivity such as copper or aluminum, and the base 160 and the heat dissipating pins 162 are integral with each other.

Since the heat spreader 16 is formed in the shape of a pin holder, air can flow upward between the heat dissipating pins 162 from below even when the display apparatus 100 is arranged in a direction such as diagonally. Therefore, in the display apparatus 100 according to the present embodiment, the arrangement method for efficient performance of heat dissipation is not limited and the user can arrange the display apparatus 100 in any direction.

Ninth Embodiment

Figure 12:
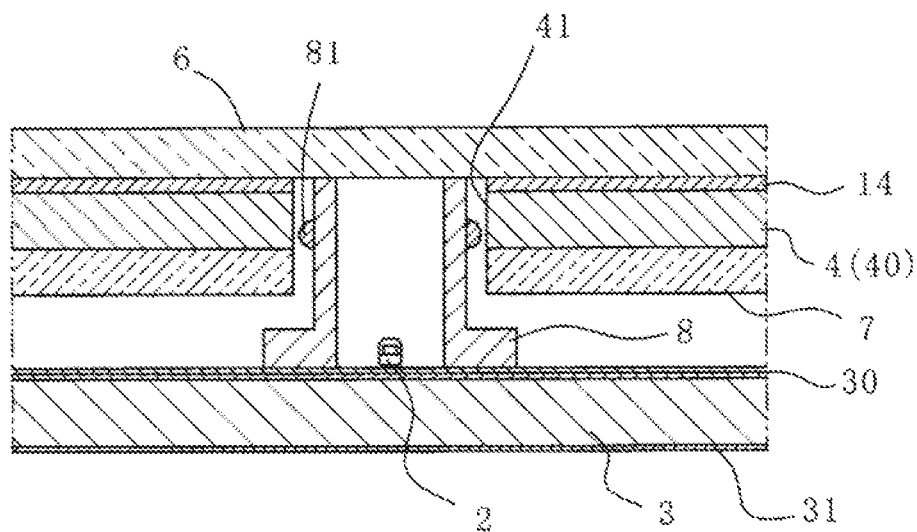
FIG. 12 is a cross-sectional view of a main part configuration of the display apparatus according to a ninth embodiment.

FIG. 12 is a perspective view of a configuration of a through hole 41 in the back chassis 4 of the display apparatus 100 according to a ninth embodiment as viewed from behind. The liquid crystal display apparatus 100 of the present embodiment illustrated in FIG. 12 includes a heat dissipating mechanism on the reverse surface of the substrate 3. Specifically, the reverse surface of the substrate 3 is subjected to a treatment for increasing efficiency (also referred to as heat dissipation efficiency in the following) at which the heat generated inside the casing 13 is dissipated out of the casing 13. Aside from configuration related to this, the configuration of the liquid crystal display apparatus 100 is the same as that in the first embodiment of FIGS. 1 and 2. Accordingly, elements that are the same in configuration as those illustrated in FIGS. 1 and 2 are labeled with the same reference signs and description thereof is omitted.

According to the present embodiment, a black coated section 31 to which a coating has been applied using black paint is formed on the reverse surface of the substrate 3 as a treatment for increasing the heat dissipation efficiency. Since black is high in radiance, the heat generated from the LEDs 2 is efficiently radiated from the reverse surface of the substrate 3 due to the formation of the black coated section 31 and the substrate 3 may be efficiently cooled. Alternatively, black tape may be attached to the reverse surface of the substrate 3 as the treatment for increasing the heat dissipation efficiency instead of the black coated section 31 being formed. In this case, the substrate 3 may also be efficiently cooled in the same manner as the configuration in which the black coated section 31 is formed.

Figure 13:
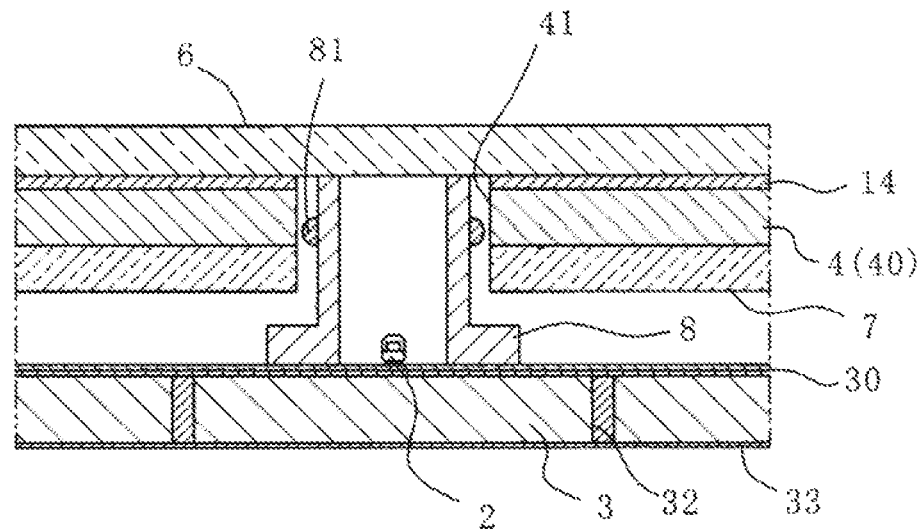
FIG. 13 is a cross-sectional view of a main part configuration of the display apparatus according to a variation of the ninth embodiment.

FIG. 13 is a cross-sectional view of a configuration of a through hole 41 in the back chassis 4 of the display apparatus 100 according to a variation of FIG. 12. According to the present variation, a configuration is possible in which a plurality of through holes 32 are formed through the substrate 3 in positions coinciding with the patterned copper foil 30 on the mounting surface. A material with high thermal conductivity is filled into the through holes 32. So as to make contact with this highly thermally conductive material, a patterned metal foil 33 with high thermal conductivity such as copper or aluminum is formed substantially across the entirety of the reverse surface of the substrate 3. It can be said that employment of such a structure of the substrate 3 is included in the treatment for increasing the heat dissipation efficiency. By employing such a structure, the heat generated from the LEDs 2 is first transmitted to the patterned copper foil 30 on the mounting surface, conducted from the patterned copper foil 30 to the patterned metal foil 33 on the reverse surface through the material filling the through holes 32, and then efficiently dissipated from the patterned metal foil 33.

According to the present embodiment, heat may be efficiently dissipated through the treatment applied to the reverse surface even when the substrate 3 is formed using comparatively inexpensive material which has low thermal conductivity such as a glass epoxy resin instead of a material with high thermal conductivity such as aluminum. As such, the substrate 3 can be formed with an inexpensive material without involving decrease in heat dissipation efficiency. Therefore, the display apparatus 100 according to the present embodiment can be produced at low cost compared to other embodiments and can display an image with the same degree of high luminance as those in the other embodiments.

The following describes preferable embodiments of the present invention.

In one embodiment, the illumination apparatus according to the present invention includes a casing with a bottom plate in which a plurality of through holes are formed, a substrate with a surface on which a plurality of light sources are mounted, and an optically transmissive plate-shaped member superimposed on the bottom plate from inside the casing so as to close the through holes. The substrate is held by the bottom plate outside the casing such that the optical axes of the light sources respectively coincide with the through holes.

According to such a configuration, the substrate on which the light sources are mounted is arranged on the outside of the casing. As such, heat generated from the light sources is dissipated out of the casing and the temperature inside the casing is inhibited from rising. The optical axes of the light sources are also configured so as to respectively coincide with the through holes in the bottom plate of the casing. As such, the light emitted from the light sources passes through the through holes in the bottom plate of the casing, enters into the casing, and is radiated toward a target even though the substrate is arranged on the outside of the casing.

In a case where the through holes are formed on the bottom plate of the casing, dust protection measures become necessary because dust may enter into the casing through the through holes. In the above configuration by contrast, dust is prevented from entering into the casing through the through holes because the plate-shaped member which closes the through holes is provided.

The illumination apparatus according to the present embodiment may further include a cylindrical member inserted into each of the through holes. The cylindrical member guides the emitted light that has entered into the cylindrical member from the light sources into the casing.

According to this configuration, the light emitted from the light sources is reliably guided into the casing by the cylindrical member and light leakage out of the casing can be prevented.

The illumination apparatus according to the present embodiment may further include a first sealing member surrounding the cylindrical member along an outer surface of the cylindrical member. The first sealing member is held between the cylindrical member and the casing.

According to this configuration, dust protection can be improved because the space between the cylindrical member and the casing is blocked by the first sealing member.

The illumination apparatus according to the present embodiment may further include a second sealing member surrounding each of the light sources along the surface of the casing. The second sealing member is held between the bottom plate and the substrate.

According to this configuration, dust protection can be improved because the second sealing member prevents the space between the casing and the substrate from communicating with the through hole.

In the illumination apparatus according to the present embodiment, the surface of the substrate may also be in contact with the outer surface of the casing on the bottom plate across the entirety of the surface of the substrate.

According to this configuration, the through holes provided in the bottom plate are closed by the substrate and dust can be prevented from entering into the casing through the through holes because the surface of the substrate and the surface of the bottom plate are in contact with each other across the entirety of these surfaces. Herein, contact between the substrate and the bottom plate is not limited to direct contact between the substrate and the bottom plate but also includes indirect contact such as a case where an interposed object such as a heat insulator exists between the substrate and the bottom plate.

In the illumination apparatus according to the present embodiment, the plate-shaped member preferably has a light diffusing function.

In one aspect, the plate-shaped member may include a light scattering material.

According to this configuration, light is successfully diffused inside the casing and the luminance of the target can be further uniformed because the plate-shaped member includes a light scattering material.

In one aspect, the surface of the plate-shaped member opposite to the surface superimposed on the bottom plate may be subjected to embossing processing.

According to this configuration, light is successfully diffused inside the casing and the luminance of the target can be further uniformed because the plate-shaped member is subjected to the embossing processing.

In one aspect, a light diffusing lens structure may be formed in each of positions coinciding with the optical axes of the light sources on the surface of the plate-shaped member opposite to the surface superimposed on the bottom plate.

According to this configuration, light is successfully diffused inside the casing and the luminance of the target can be further uniformed because the light diffusing lens structure is formed on the plate-shaped member.

The illumination apparatus according to the present embodiment preferably includes a heat dissipating mechanism on the reverse surface of the substrate.

In one aspect, the illumination apparatus according to the present embodiment may further include a heat dissipating member in contact with the reverse surface of the substrate.

According to this configuration, the heat generated from the light sources is mainly dissipated from the reverse surface of the substrate toward the back of the illumination apparatus by the heat dissipating member provided on the reverse surface of the substrate. Accordingly, heat generated from the light source is further inhibited from transferring into the casing because the amount of heat dissipated from the surface of the substrate toward the casing is reduced.

In one aspect, the heat dissipating member may include a base in contact with the substrate and a plurality of heat dissipating fins standing from the base.

According to this configuration, in a case where the illumination apparatus is arranged such that the heat dissipating fins extend in the up-and-down direction, the heat efficiently moves from the substrate into air and the substrate is efficiently cooled because warmed air flows upward between the heat dissipating fins. Accordingly, heat generated from the light sources is further inhibited from transferring into the casing.

In one aspect, the heat dissipating member may include a base in contact with the substrate and a plurality of heat dissipating pins standing from the base.

According to this configuration, the substrate is efficiently cooled regardless of arrangement direction because the flow of air occurs between the heat dissipating pins even when the illumination apparatus is arranged in a direction such as diagonally. Accordingly, heat generated from the light sources is further inhibited from transferring into the casing.

In one aspect, the reverse surface of the substrate may be subjected to a treatment for increasing heat dissipation efficiency.

According to this configuration, the heat generated from the light sources is mainly dissipated from the reverse surface of the substrate toward the back of the illumination apparatus. Accordingly, heat generated from the light sources is further inhibited from transferring into the casing because the amount of heat dissipated toward the casing is reduced.

In a preferable embodiment, the substrate is made from a metal.

According to this configuration, the substrate is made from a metal which has high thermal conductivity, with a result that the heat from the light sources is efficiently dissipated. Accordingly, heat generated from the light sources is further inhibited from transferring into the casing.

In one embodiment, the display apparatus according to the present invention includes any one of the above-mentioned illumination apparatuses and a display panel which displays an image by controlling transmittance of the light emitted from the light sources.

According to this configuration, the temperature of the display panel is inhibited from rising because heat generated from the light sources is inhibited from transferring into the casing by the configuration of the above illumination apparatuses.

The above describes specific embodiments of the present invention and variations thereof, but the present invention is not limited to the above embodiment and can be variously altered and implemented within a scope of the present invention. For example, contents of the individual embodiments may be appropriately combined to form an embodiment of the present invention.

REFERENCE SIGNS LIST

100 Liquid crystal display apparatus (display apparatus)
200 Backlight (illumination apparatus)
1 Liquid crystal panel (display panel)
2 LED (light source)
3 Substrate
30 Patterned copper foil
31 Black coated section
32 Through hole
33 Patterned metal foil
4 Back chassis
40 Bottom plate
41 Through hole
42 Side plate
43 Edge
5 Spacer
6 Plate-shaped member
7 Heat insulator
8 Cylindrical member
81 Ring-shaped rib (first sealing member)
9 Diffuser plate
10 Optical sheet laminate
11 Panel chassis
12 Bezel
13 Casing
14 Reflecting sheet
15 Ring (second sealing member)
16 Heat spreader (heat dissipating member)
160 Base
161 Heat dissipating fin

The invention claimed is:

1. An illumination apparatus comprising:
a casing with a bottom plate having a plurality of through holes;
a substrate with a surface to which a plurality of light sources are mounted, the substrate being held by the bottom plate outside the casing such that optical axes of the light sources respectively coincide with the through holes;
an optically transmissive plate-shaped member superimposed on the bottom plate from inside the casing so as to close the through holes, and
a cylindrical member inserted into each of the through holes and configured to guide emitted light that has entered into the cylindrical member from each of the light sources into the casing.

2. The illumination apparatus according to claim 1, further comprising
a first sealing member held between the cylindrical member and the casing and surrounding the cylindrical member along an outer surface of the cylindrical member.

3. The illumination apparatus according to claim 1, further comprising
   a second sealing member held between the bottom plate and the substrate, and surrounding each of the light sources along the surface of the substrate.
4. The illumination apparatus according to claim 1, wherein
   the plate-shaped member has a light diffusing function.
5. The illumination apparatus according to claim 1, comprising
   a heat dissipating mechanism on a reverse surface of the substrate.
6. A display apparatus comprising:
   the illumination apparatus according to claim 1; and
   a display panel configured to display an image by controlling transmittance of the emitted light from the light sources.
7. The illumination apparatus according to claim 4, wherein
   the plate-shaped member includes a lens structure in each of positions coinciding with the light sources, and
   the lens structure has a function of diffusing the light from each of the light sources.
8. The illumination apparatus according to claim 5, wherein
   the heat dissipating mechanism includes a base in contact with the substrate and a plurality of heat dissipating pins standing from the base, and
   the heat dissipating pins dissipate heat conducted from the substrate.

* * * * *